United States Patent Office 2,924,552
Patented Feb. 9, 1960

2,924,552
HEAVY METAL-DIAMINE DOUBLE SALTS

James Harwood, Western Springs, Richard A. Reck, Chicago, and Walter W. Abramitis, Downers Grove, Ill., assignors to Armour and Company, Chicago, Ill., a corporation of Illinois No Drawing. Application July 13, 1956
Serial No. 597,580

12 Claims. (Cl. 167—22)

This invention in one of its aspects relates to double salts of heavy metal salts and certain diamine hydrohalides. In another of its aspects, the invention relates to fungicidal compositions containing as the essential active ingredient the aforesaid heavy metal diamine double salts.

The novel compounds of the present invention comprise the double salt of a heavy metal salt and a diamine hydrohalide, said diamine having the formula

wherein R is an aliphatic hydrocarbon radical having from 8 to 20 carbon atoms, R' is either hydrogen or methyl with at least one R' being hydrogen, and $n$ is an integer of from 2 to 5.

The double salts of this invention are produced, generally, by forming a solution containing a diamine and a hydrogen halide gas such as hydrogen chloride and adding a solution containing a heavy metal salt. It is an important element of the invention that the reactants be added in such quantities that the proper ratios are present for forming the double salts rather than complexes or mixtures. In connection with the object of preparing the double salts, rather than complexes, we have made the following observations: (1) When long-chain N-substituted diamines containing both primary and secondary amino groups, or both secondary and tertiary amino groups, are used with heavy metal salts, the resulting double salts or complexes in most cases involve two moles of the diamine for each mole of heavy metal compound. (2) A tertiary amino group, unlike the primary or secondary amines, will not complex with a metal salt. Therefore, the nitrogen atoms contained in primary or secondary amino groups can be called coordinative nitrogens, whereas the nitrogen atom in a tertiary amino group is not a coordinative nitrogen. (3) When diamines containing coordinative nitrogen atoms are mixed with heavy metal salts, complexes between the two substances are formed unless sufficient hydrogen halide is present to neutralize or block all the coordinative nitrogen atoms and thus prevent the formation of complexes or coordination compounds. (4) Therefore, in order to prepare double salts of diamines and heavy metals, it is necessary to add enough moles of hydrogen halide to neutralize or block all of the amino groups, unless the diamine contains a tertiary amino group, in which case the number of moles of hydrogen halide can be reduced.

As a specific example illustrating the above, if 1 mole of copper chloride ($CuCl_2$) is mixed with 2 moles of N-aliphatic-trimethylenediamine ($RNH-(CH_2)_3-NH_2$), a complex will be formed unless 4 moles of hydrogen halide are also added. 2 moles of N-aliphatic trimethylenediamine contain 4 coordinatable nitrogen atoms, and therefore the 4 moles of hydrogen halide are required. If, for example, only 2 moles of hydrogen halide are used, this means that only 2 of the 4 coordinatable nitrogens are blocked, and therefore the 2 remaining nitrogen atoms are available for forming a complex with the copper chloride, and the double salt will not be formed.

As a further specific example of the above, if 1 mole of copper chloride ($CuCl_2$) is mixed with 2 moles of a diamine such as N-aliphatic-N',N'-dimethyltrimethylenediamine, which contains one tertiary and one secondary amino group, it is necessary only to use 2 moles of the hydrogen halide to obtain the double salt, since only one coordinative nitrogen atom in each diamine molecule must be blocked in order to provide the proper conditions for formation of the double salt.

Although in the foregoing description, the carrying out of the reaction is described in terms of adding three ingredients, namely, the diamine, the hydrogen halide, and the heavy metal salt, it will be understood that the invention also contemplates the use of equivalent procedures and materials such as, for example, the use of a diamine dihydrohalide instead of the diamine and the hydrogen halide separately.

Structurally, the double salts of the present invention are distinguished from complexes by reason of the fact that in the double salts the metal is not coordinated with amino nitrogen, whereas in the complex it is coordinated with amino nitrogen. Thus, for example, one embodiment of the double salts of the present invention may be structurally portrayed as follows:

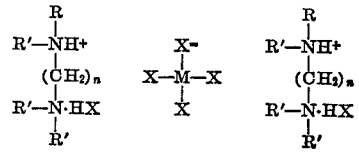

The structural formula for the above may be given as follows:

wherein R is an aliphatic hydrocarbon radical having from 8 to 20 carbon atoms, R' is either hydrogen or methyl with at least one R' in each diamine molecule being hydrogen, $n$ is an integer of from 2 to 5, X is halide and M is a heavy metal.

As a further means of distinguishing the double salts of this invention, the color may be employed as an identifying factor in the case of some of the heavy metal compounds. Thus, for example, when copper is used as the heavy metal, the double salts of the present invention under normal conditions have a characteristic yellow color, as distinguished from the dark blue or purple color of secondary amine-copper chloride complexes or the light blue color of primary amine-copper chloride complexes.

Any suitable "heavy" metal may be used as a component of the double salts contemplated by the present invention. Such metals are to be found in groups IB, IIB, VIB, VIIB, and VIII of the periodic chart of the elements. As specific examples, we may use the salts of heavy metals such as copper, chromium, tin, zinc, cadmium, mercury, manganese, iron, cobalt, and nickel. The use of copper, cadmium, zinc, manganese, and iron salts is preferred. Although we prefer to use halides as the anionic portion of the heavy metal salts, it will be understood that other suitable anions such as acetate, sulphate, nitrate, and oxalate, may also be used.

Various substituted polymethylenediamines may be employed as starting materials in preparing the double salts of the present invention. In general, any polymethylenediamine compound one of whose amino hydrogens is replaced by a long-chain aliphatic group having 8 to 20 carbon atoms will serve. Additionally, amines of the type just mentioned, having one or more but not all of the amino hydrogens replaced by a methyl group, will also serve. These diamines may be represented structurally as RR'N—$(CH_2)_n$—$NR'_2$, wherein R is an aliphatic hydrocarbon radical having from 8 to 20 carbon atoms, R' is either hydrogen or methyl, at least one R' is hydrogen and $n$ is an integer of from 2 to 5. Generally, the N-substituted trimethylenediamine compounds are most readily available and to this extent are preferred in the preparation of the double salts of this invention. N-substituted polymethylenediamine compounds such as the following representative members may be employed: N-octyl, N-decenyl, N-dodecyl, N-dodecenyl, N-tetradecyl, N-tetradecyl, N-hexadecyl, N-hexadecenyl, N-octadecyl, N-octadecenyl, and N-octadecadienyl.

Mixtures of diamine compounds may also be employed, particularly mixtures of diamines derived from naturally occurring fats and oils, such as soybean oil, coconut oil, tallow, and the like. Examples of preferred diamine mixtures are N-tallow-polymethylenediamine (derived from tallow and in which "tallow" comprises a mixture of the following aliphatic radicals: dodecyl, tetradecyl, tetradecenyl, hexadecyl, hexadecenyl, octadecyl, octadecenyl, octadecadienyl, and eicosyl); N-coco-polymethylenediamine (derived from coconut oil and in which "coco" comprises a mixture of hexyl, octyl, decyl, dodecyl, tetradecyl, hexadecyl, octadecyl, octadecenyl, and octadecadienyl radicals); and N-soya-polymethylenediamine (derived from soybean oil and in which "soya" comprises a mixture of hexadecyl, octadecyl, eicosyl, octadecenyl, octadecadienyl, and octadecatrienyl radicals). Hereinafter, the terms "tallow," "coco," and "soya" are meant to refer to the respective mixtures of radicals set forth above.

Also applicable to the present invention as indicated above, are the polysubstituted N-aliphatic-polymethylenediamines having at least one N-substituted, also referred to herein as amino-substituted) methyl group, as for example, N-aliphatic-N-methylpolymethylenediamine, N-aliphatic - N,N' - dimethylpolymethylenediamine and N-aliphatic-N',N'-dimethylpolymethylenediamine.

The reaction may be carried out without special apparatus. It may be conducted in any convenient vessel adapted to contain the reactants. The reaction proceeds spontaneously merely by mixing or contacting the reactants in the presence of moderate heat. To facilitate contact it is desirable to dissolve the reactants in a suitable liquid solvent which is a mutual solvent for the reactants, i.e., a solvent which will dissolve each of the reactants. Preferably, the solvent should not enter into, or interfere with, the desired reaction. Generally, solvents having a minor proportion of water are suitable, as, for example, 95% aqueous ethanol. Various low-molecular-weight organic solvents will be suitable for the reaction, in particular the low alcohols and ketones and the lower homologs of toluene, and the like. Mixtures of such solvents may likewise be employed.

According to the preferred practice, the reaction is favored with a moderate amount of heat, although it is quite satisfactory to conduct the reaction at room temperature. Higher and lower temperatures may be employed, but at relatively high temperatures there is an undesirable tendency toward breakdown of the double salts. It is advisable to agitate and stir the reaction mixture until the reaction is substantially completed.

There is considerable variation in the length of time required for completion of the reaction. In some cases the reaction is completed almost instantaneously while in other cases several hours are required for completion of the reaction. In any case, it will be clear that it is not necessary to react all of the reacting materials in order to obtain a satisfactory product. In other words, the reaction may be terminated as soon as the desired quantity of product is obtained.

Following the desired reaction the product may be isolated from the reaction zone by any suitable method. For example, the reaction mixture may be cooled so as to cause precipitation or crystallization of the product and the mixture then filtered or decanted to isolate the product. Also, it will be satisfactory to evaporate the solvent and thereby leave the desired product as a residue.

The double salts described above can be used as an active ingredient in compositions for combating fungal attack. Such compositions can take the form of emulsions, solutions, powders, etc. When used on growing plants, the double salts are not applied in full strength but instead are combined with an inert carrier so that a fungistatic but non-phytotoxic concentration of the double salts can be applied to the growing plants. It has been found that there is a considerable margin of safety between active and phytotoxic concentrations. For example, with most of the compounds falling within the scope of this invention, an effective fungistatic or fungitoxic action is obtained in concentrations ranging from 10 to 100 parts per million, whereas no phytotoxicity is exhibited in concentrations of 1,000 parts per million or more, and in the hardier plants concentrations as high as 5,000 and 6,000 parts per million produce no phytotoxicity. This permits the fungicidal composition of this invention to be applied to plants without danger of phytotoxicity due to over concentrations. It will be understood that the above concentrations are in terms of solutions or suspensions which are sprayed on plants and that such concentrations are subject to upward adjustment when used in connection with dry, powdered compositions which are applied by dusting on plants.

This invention is further illustrated and its value shown by the following specific examples:

EXAMPLE 1

*N-dodecyltrimethylenediamine dihydrochloride-cupric chloride double salt*

A solution of 8.3 gms. (0.05 mole) of $CuCl_2 \cdot 2H_2O$ in 100 ml. of isopropyl alcohol was added with stirring to 24.2 gms. (0.1 mole) of N-dodecyltrimethylenediamine and 7.4 gms. (0.2 mole) of hydrogen chloride dissolved in 250 ml. of isopropyl alcohol. The solution turned yellow, and the double salt precipitated. Upon cooling, the double salt was filtered and dried. The yellow double salt had the formula

Calculated: N, 7.33; Cl, 27.9; Cu, 8.33. Found: N, 7.36; Cl, 27.8; Cu, 8.75.

EXAMPLE 2

*N-tallow-trimethylenediamine dihydrochloride-cupric chloride double salt*

A solution containing 0.1 mole of cupric chloride ($CuCl_2 \cdot 2H_2O$) in a solution of isopropyl alcohol was added with stirring to 0.2 mole of N-tallow-trimethylenediamine and 0.4 mole of hydrogen chloride also dissolved in isopropyl alcohol. The solution turned yellow and the double salt precipitated. Upon cooling, the double salt was filtered and dried.

EXAMPLE 3

*N-soya-trimethylenediamine dihydrochloride-cupric chloride double salt*

A solution containing 0.1 mole of cupric chloride ($CuCl_2 \cdot 2H_2O$) in a solution of isopropyl alcohol was added with stirring to 0.2 mole of N-soya-trimethylenediamine and 0.4 mole of hydrogen chloride also dissolved in isopropyl alcohol. The solution turned yellow and the double salt precipitated. Upon cooling the double salt was filtered and dried.

EXAMPLE 4

N-(1-methyldodecyl)-N',N'-dimethyltrimethylenediamine hydrochloride-cupric chloride double salt A solution containing 0.1 mole of cupric chloride (CuCl$_2$·2H$_2$O) in a solution of isopropyl alcohol was added with stirring to 0.2 mole of N-(1-methyldodecyl)-N',N'-dimethyltrimethylenediamine and 0.2 mole of hydrogen chloride also dissolved in isopropyl alcohol. The solution turned yellow and the double salt precipitated. Upon cooling, the double salt was filtered and dried. The yellow double salt had the formula:

[C$_{11}$H$_{23}$CH(CH$_3$)NH$_2$(CH$_2$)$_3$N(CH$_3$)$_2$]$_2^+$(CuCl$_4$)=

Calculated: N, 7.25; Cl, 18.4. Found: N, 7.01; Cl, 18.6.

EXAMPLE 5

N-dodecyltrimethylenediamine dihydrochloride-cupric chloride double salt

A solution of 8.3 gms. (0.05 mole) of CuCl$_2$·2H$_2$O in 100 ml. of isopropyl alcohol was added with stirring to 24.2 gms. (0.1 mole) of N-dodecyltrimethylenediamine and 7.4 gms. (0.2 mole) of hydrogen chloride dissolved in 250 ml. of isopropyl alcohol. The solution turned yellow and the double salt precipitated. Upon cooling, the double salt was filtered and dried. The yellow double salt had the formula

[C$_{12}$H$_{25}$NH$_2$(CH$_2$)$_3$NH$_3$]$_2^{++}$CuCl$_4$=Cl$_2^-$

Calculated: N, 7.33; Cl, 27.9; Cu, 8.33. Found: N, 7.30; Cl, 27.4; Cu, 8.66.

EXAMPLE 6

The fungicidal activity and the phytotoxicity of the foregoing compounds were tested according to the following procedure:

*Fungicidal activity.*—For this test, the Standard Fungicidal Test of the American Phytopathological Society was employed using the fungi: peach brown rot (*Monilinia fructicola*); apple bitter rot (*Glomerella cingulata*); and tomato early blight (*Alternaria oleracea*). Briefly described, this test involves subjecting the spores of various fungi to graded concentrations of the test compound and determining the extent of spore germination at the end of 24 hours. The calculated percentage of spores not germinated serves as an index of the fungistatic or fungicidal activity of the chemical. A check is kept on the viability of the culture.

*Phytotoxicity tests.*—Young tomato, pepper, and bean plants contained in individual pots are placed on a slowly revolving stand and sprayed from above and below at 45-degree angles to the point of runoff. The materials are prepared as aqueous solutions with a wetting agent, or as emulsions, and applied to the plants by means of an atomizer at 12.5 p.s.i. As the plants are sprayed, they are tagged and returned to an artificially lighted plant table for observation.

*Results.*—The compounds tested, concentrations used, the percentage of spore germination obtained for each organism, and the phytotoxic response levels of tomato, pepper, and bean plants are presented in Table I below:

TABLE I

| Compound | Organism | Percent Spore Germination at conc. in p.p.m. | | | | LD$_{50}$, p.p.m. | Minimal Phytotoxic Dosage in p.p.m. | | |
|---|---|---|---|---|---|---|---|---|---|
| | | 100 | 10 | 1.0 | 0.1 | | Tomato | Pepper | Bean |
| N-dodecyltrimethylenediamine dihydrochloride-cupric chloride double salt (Example 1) | A.o. | 0.0 | 0.1 | 63.8 | 93.1 | 1.4 | 3,000 | 4,000 | |
| | G.c. | 0.0 | 34.6 | 95.3 | 98.7 | 7.4 | | | |
| | M.f. | 0.0 | 0.0 | 42.6 | 90.3 | 0.0 | | | |
| N-tallow-trimethylenediamine dihydrochloride-cupric chloride double salt (Example 2) | A.o. | 0.0 | 36.6 | 89.9 | 99.5 | 6.2 | | | 1,000 |
| | G.c. | 0.0 | 19.4 | 86.4 | 97.6 | 3.7 | | | |
| | M.f. | 0.0 | 28.1 | 86.6 | 97.1 | 4.6 | | | |
| N-soya-trimethylenediamine dihydrochloride-cupric chloride double salt (Example 3) | A.o. | 0.0 | 51.0 | 97.2 | 98.6 | 10.2 | | | 1,000 |
| | G.c. | 0.0 | 96.1 | 99.0 | 99.5 | 29.0 | | | |
| | M.f. | 0.0 | 38.8 | 92.7 | 97.6 | 6.8 | | | |
| N-(1-methyldodecyl)-N',N'-dimethyltrimethylenediamine hydrochloride-cupric chloride double salt (Example 4) | A.o. | 0.0 | 0.0 | 63.9 | 94.4 | 1.4 | 2,000 | 2,000 | |
| | G.c. | 0.0 | 0.0 | 73.0 | 97.6 | 1.7 | | | |
| | M.f. | 0.0 | 8.5 | 90.5 | 98.6 | 3.1 | | | |
| N-dodecyltrimethylenediamine dihydrochloride-cupric chloride double salt (Example 5) | A.o. | 0.0 | 0.0 | 84.9 | 96.1 | 2.2 | | | 1,000 |
| | G.c. | 0.0 | 56.0 | 97.7 | 98.8 | 11.9 | | | |
| | M.f. | 0.0 | 0.0 | 76.3 | 96.7 | 1.8 | | | |

The term LD$_{50}$ in the foregoing Table I means the lethal dose required to kill 50% of the test organisms.

EXAMPLE 7

(A) An emulsifiable concentrate consists of:

50% active chemical

5–10% non-ionic emulsifier such as the coco acid or rosin fatty acid esters of polyethylene glycols 45–40% aromatic or aliphatic solvent such as xylene or acetone This is diluted with water to give 1–2 lbs. active ingredient per 100 gals. water for the final spray.

(B) A wettable powder which may be used in the form of a water spray consists of:

50–75% active chemical

5% non-ionic emulsfiier such as the coco fatty acid or rosin fatty acid esters of polyethylene glycols 45–20% inert diluent such as pyrophyllite, clays, celite, etc.

One to two pounds of this powder is placed in 100 gals. of water and sprayed in this form.

(C) A dust concentrate composition consists of:

50–75% active ingredient

50–25% inert diluent such as pyrophyllite clays, celite, etc.

The average particle size should not be greater than 30 microns. Efficiency appears to increase with the fineness of the dust.

It will be understood that any of the double salts described herein can be used in the specific formulations of this example.

While in the foregoing specification this invention has been described in relation to certain specific embodiments thereof and details have been set forth for the purpose of illustration, it will be apparent to those skilled in the art that the invention is susceptible of other embodiments and many of the details set forth herein can be varied considerably without departing from the basic concept of the invention.

We claim:

1. As a composition of matter, the double salt of a heavy metal salt and a diamine hydrohalide containing a mole of hydrohalide for each primary and secondary group in the diamine, said diamine having the formula RR'N—(CH$_2$)$_n$—NR'$_2$, wherein R is an aliphatic hydrocarbon radical having from 8 to 20 carbon atoms, R' is a radical selected from the group consisting of methyl and hydrogen radicals, at least one R' is hydrogen, and $n$ is an integer of from 2 to 5.

2. The composition of matter set forth in claim 1 wherein said heavy metal salt is copper chloride.

3. The composition of matter set forth in claim 1 wherein said diamine is an N-aliphatic-trimethylenediamine.

4. The composition of matter set forth in claim 1 wherein said diamine is N-dodecyltrimethylenediamine.

5. The composition of matter set forth in claim 1 wherein said diamine is N-soya-trimethylenediamine.

6. The composition of matter set forth in claim 1 wherein said diamine is N-(1-methyldodecyl)-N',N'-dimethyltrimethylenediamine.

7. A fungicidal composition comprising a carrier and an effective concentration of a double salt of a heavy metal salt and a diamine hydrohalide containing a mole of hydrohalide for each primary and secondary group in the diamine said diamine having the formula

RR'N—(CH$_2$)$_n$—NR'$_2$ wherein R is an aliphatic hydrocarbon radical having from 8 to 20 carbon atoms, R' is a radical selected from the group consisting of methyl and hydrogen radicals, at least one R' is hydrogen, and $n$ is an integer of from 2 to 5.

8. The fungicidal composition set forth in claim 7 wherein said heavy metal salt is copper chloride.

9. The fungicidal composition set forth in claim 7 wherein said diamine is an N-aliphatic-trimethylenediamine.

10. The fungicidal composition set forth in claim 7 wherein said diamine is N-dodecyltrimethylenediamine.

11. The fungicidal composition set forth in claim 7 wherein said diamine is N-soya-trimethylenediamine.

12. The fungicidal composition set forth in claim 7 wherein said diamine is N-(1-methyldodecyl)-N',N'-dimethyltrimethylenediamine.

References Cited in the file of this patent

UNITED STATES PATENTS

| 930,836 | Busch | Aug. 10, 1909 |
| 2,686,798 | Gmitter | Aug. 17, 1954 |

OTHER REFERENCES

Grossman et al.: Zeitschrift für Anorganische Chemie, Band 50 (1926), pp. 21–32.

J.A.C.S., vol. 68, January 1946, pp. 67 to 69.